United States Patent
Jang et al.

(10) Patent No.: US 6,891,580 B2
(45) Date of Patent: May 10, 2005

(54) BACKLIGHT ASSEMBLY OF LIQUID CRYSTAL DISPLAY DEVICE

(75) Inventors: Myong Gi Jang, Seoul (KR); Se Chang Won, Pyongtaek-shi (KR); Dong Jae You, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/184,114

(22) Filed: Jun. 28, 2002

(65) Prior Publication Data

US 2003/0020849 A1 Jan. 30, 2003

(30) Foreign Application Priority Data

Jul. 10, 2001 (KR) .................... 10-2001-41346

(51) Int. Cl.⁷ ............................................ G02F 1/1333

(52) U.S. Cl. .............................. 349/58; 349/64; 349/65; 349/110; 349/111; 362/31; 362/32; 362/561

(58) Field of Search ............................. 349/64, 65, 58, 349/110, 111; 362/31, 32, 561

(56) References Cited

U.S. PATENT DOCUMENTS

| | | | | | |
|---|---|---|---|---|---|
| 5,317,430 | A | * | 5/1994 | Uratani | 349/65 |
| 5,392,199 | A | * | 2/1995 | Kashima et al. | 362/31 |
| 5,886,759 | A | * | 3/1999 | Mashino et al. | 349/65 |
| 6,317,177 | B1 | * | 11/2001 | Matsushita et al. | 349/65 |
| 6,388,722 | B1 | * | 5/2002 | Yoshii et al. | 349/62 |
| 6,580,476 | B2 | * | 6/2003 | Hasegawa | 349/58 |
| 6,600,526 | B2 | * | 7/2003 | Yano | 349/65 |
| 6,611,092 | B2 | * | 8/2003 | Fujishiro | 313/493 |

FOREIGN PATENT DOCUMENTS

KR   1019990239747   10/1999

* cited by examiner

Primary Examiner—Steven S. Paik
(74) Attorney, Agent, or Firm—McKenna Long & Aldridge LLP

(57) ABSTRACT

A backlight assembly of a liquid crystal display (LCD) device is disclosed, in which each edge of the diffusion and prism sheets is extended to upper surfaces of the metal reflecting plate and the mold frame, so that it is possible to prevent light emitted from a lamp from leaking into a liquid crystal panel without passing through one of the diffusion and prism sheet.

2 Claims, 3 Drawing Sheets

BACKLIGHT ASSEMBLY OF LIQUID CRYSTAL DISPLAY DEVICE

This application claims the benefit of Korean Patent Application No. 2001-41346, filed on Jul. 10, 2001, which is hereby incorporated by reference for all purposes as if fully set forth herein.

BACKGROUND OF THE INVENTION

1. Field of the Invention

The present invention relates to a backlight assembly of a flat type liquid crystal display (LCD) device, and more particularly, to a backlight assembly of an LCD device for preventing light emitted from a lamp from leaking into a liquid crystal panel without passing through a diffusion or prism sheet of the backlight assembly.

2. Discussion of the Related Art

In general, a liquid crystal display (LCD) device, one type of flat display, provides excellent visual perception as compared to a cathode-ray tube (CRT), consumes much less power than a CRT of the same size, and produces significantly less heat. Because of these features, in addition to a plasma display panel (PDP) and a field emission display (FED), the LCD has been drawing particular attention as a next generation display for cellular phones, computer monitors and TV receivers.

A typical LCD device is provided with two thin glass substrates having surfaces that have been specially treated and a liquid crystal injected between the glass substrates. The liquid crystal is in a state between solid and liquid. The arrangement of the molecules of the liquid crystal are changed according to a voltage difference between electrodes formed on the glass substrates. Changing the orientation of the liquid crystal molecules varies the light transmittance through the LCD panel so that varying degrees of brightness and darkness are generated on a display panel, thereby displaying an image. However, an LCD panel does not emit light by itself. Thus, a light source, such as a lamp, is additionally required to produce an image on the panel.

In general, in a portable or notebook computer the LCD device module includes a backlight assembly as a light source behind or along the LCD panel.

As shown in FIG. 1 to FIG. 3, the LCD module is provided with a liquid crystal panel 10, a backlight assembly 20 and a metal chassis 30.

The backlight assembly 20 for emitting light to the liquid crystal panel 10 is provided with lower and upper diffusion sheets 26 and 29, lower and upper prism sheets 27 and 28 at the rear of the liquid crystal panel 10, a light-guiding plate 24, a reflecting sheet 25, a lamp 22, a metal reflecting plate 23 surrounding the lamp 22, and a substantially rectangular mold frame 21 of synthetic resins for supporting each element. The rectangular metal chassis 30 fixes and supports each corner of the liquid crystal panel 10 and the backlight assembly 20.

In the backlight assembly of the related art LCD module, the lower diffusion sheet 26 is positioned at the lowest layer among the diffusion sheets formed on the light-guiding plate 24. The lower diffusion sheet 26 may be slightly spaced from the edge or margin of the metal reflecting plate 23 due to heat or interval between process steps, so that a gap 't' is generated between the lower diffusion sheet 26 and the metal reflecting plate 23 and/or the mold frame 21. Accordingly, if light leak through the gap 't', a white line is generated in the margin of the bottom of the liquid crystal panel 10.

When external force impacts on the LCD device, the sheets are moved to one side, so that the light leakage increases to further deteriorate the image display.

Accordingly, as shown in FIG. 1, a black matrix 29a is printed along the margin of the upper diffusion sheet 29 to prevent the light from leaking in the gap 't' between the diffusion sheet and the metal reflecting plate 23 or mold frame 21. In another way, as shown in FIG. 2, a pad 40 may be interposed between the upper diffusion sheet 29 and the upper prism sheet 28 to prevent light from leaking in the gap 't'.

However, the aforementioned display devices have the following problems.

First, if the black matrix 29a is formed on the upper diffusion sheet 29 to prevent light from leaking in the gap 't', manufacturing process steps are complicated.

Also, if the pad 40 is interposed between the upper diffusion sheet and the upper prism sheet to prevent light from leaking in the gap 't', the thickness of the LCD device is increased, which makes the device less desirable for use in a notebook computer or other portable device.

SUMMARY OF THE INVENTION

Accordingly, the present invention is directed to a backlight assembly of an LCD device that substantially obviates one or more problems due to limitations and disadvantages of the related art.

An advantage of the present invention is to provide a backlight assembly of an LCD device in a liquid crystal panel, in which it is possible to prevent light from leaking, the LCD device having a simplified manufacturing process.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a backlight assembly of a liquid crystal display (LCD) device according to the present invention, for emitting light for an entire surface of a liquid crystal panel, includes a rectangular mold frame, a lamp for emitting light mounted at one side of the mold frame, a metal reflecting plate surrounding one part of the lamp mounted at the side of the mold frame having the lamp, a light-guiding plate mounted in parallel with the lamp at the mold frame, a reflecting sheet positioned under the light-guiding plate, a plurality of diffusion and prism sheets positioned on the light-guiding plate, wherein each edge of the diffusion and prism sheets is extended to upper surfaces of the metal reflecting plate and the mold frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
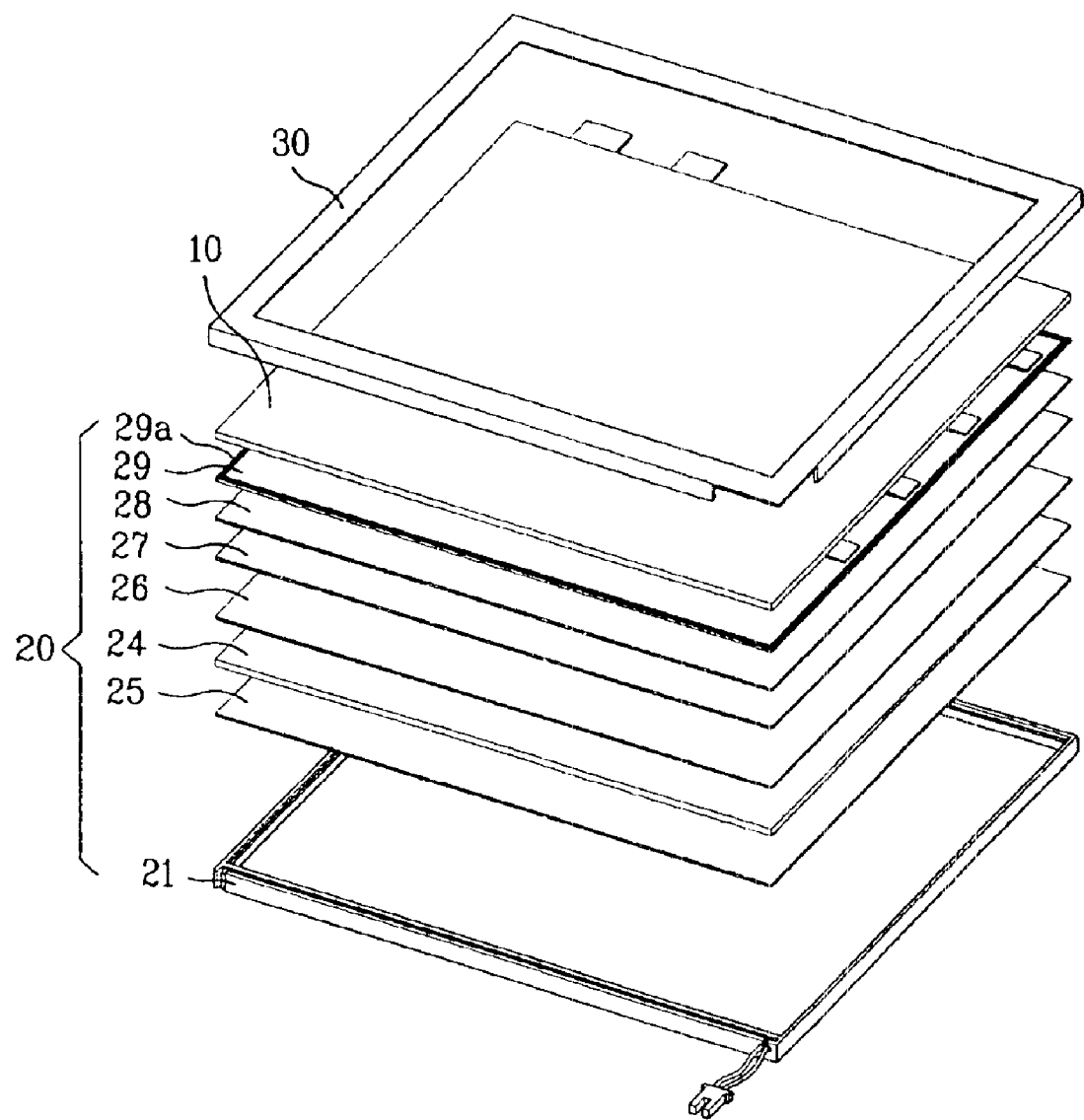
FIG. 1 is an exploded perspective view showing an LCD module of a related art LCD device.
Figure 2:
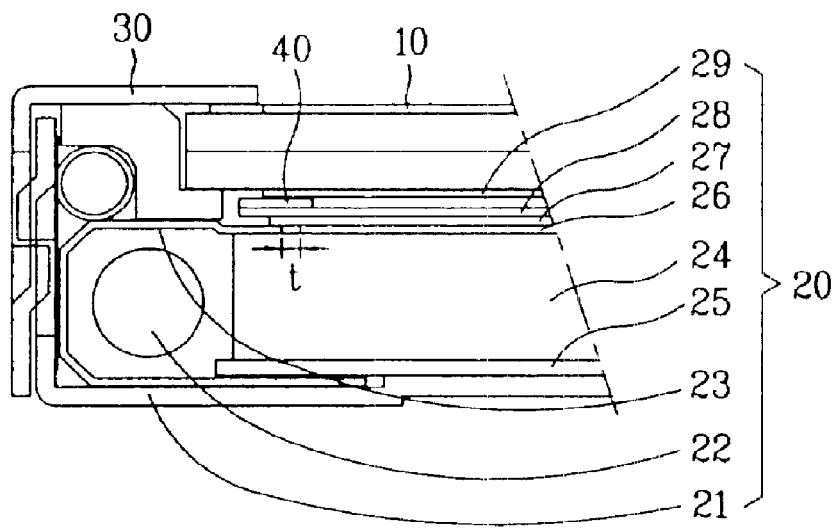
FIG. 2 is a sectional view showing a lower part of a related art LCD module.
Figure 3:
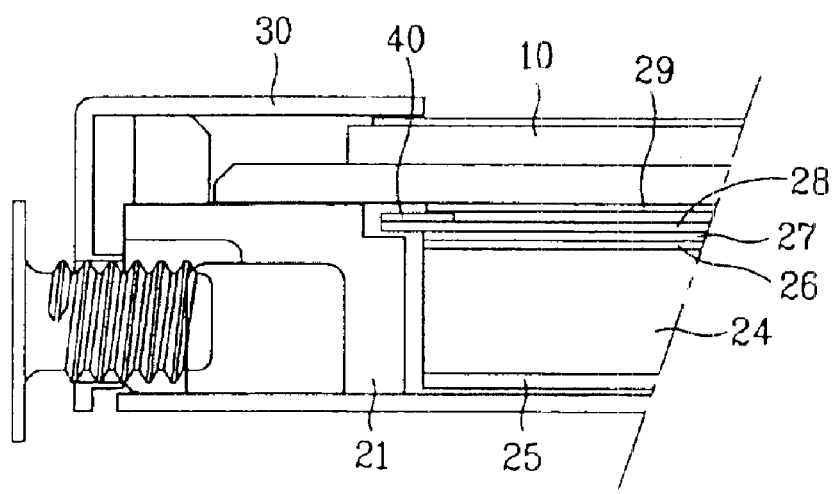
FIG. 3 is a sectional view showing a lateral part of a related art LCD module.
Figure 4:
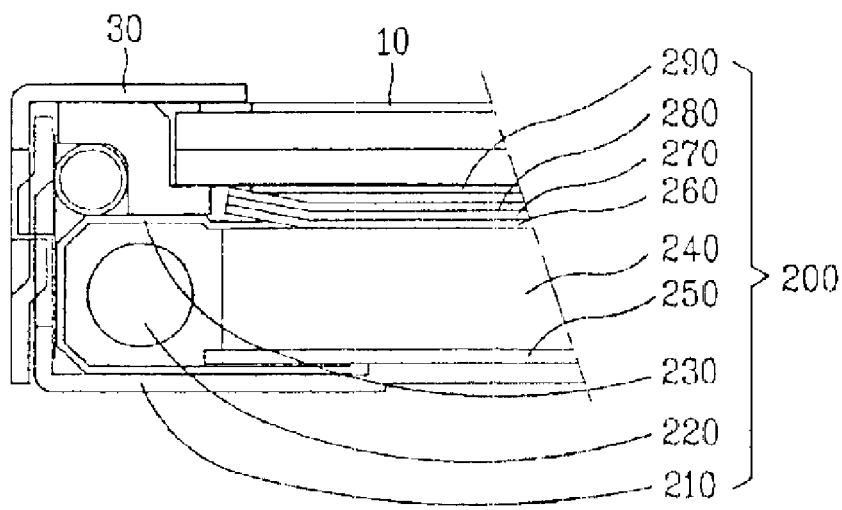
FIG. 4 is a sectional view showing a lower part of an LCD module having a backlight assembly according to the present invention.
Figure 5:
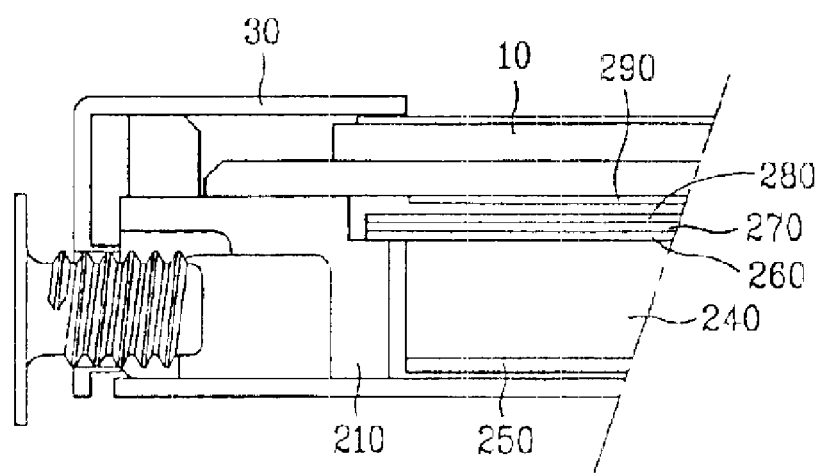
FIG. 5 is a sectional view showing a lateral part of an LCD module having a backlight assembly according to the present invention.

FIG. 4 and FIG. 5 are sectional views illustrating lower and lateral parts in an LCD module of a portable computer having a backlight assembly according to the present invention.

Referring to FIG. 4 and FIG. 5, the LCD module is provided with a liquid crystal panel 10, a backlight assembly 200 and a metal chassis 30.

The liquid crystal panel 10 is provided with two polarizers and a liquid crystal injected between the two polarizers for outputting an image. Then, the backlight assembly is mounted at the rear of the liquid crystal panel 10 for emitting light to an entire surface of the liquid crystal panel 10. The rectangular metal chassis 30 fixes and supports each corner of the liquid crystal panel 10 and the backlight assembly 200.

Also, the backlight assembly 200 is provided with a rectangular mold frame 210 preferably formed of synthetic resin, a lamp 220 mounted at one side of the mold frame 210 for emitting light, and a metal reflecting plate 230 surrounding one part of the lamp 220 at the side of the mold frame 210. The metal reflecting plate 230 functions as part of a lamp housing and reflects light emitted from the lamp. The backlight assembly 200 further includes a light-guiding plate 240 formed at the mold frame 230 in parallel to the lamp 220 for guiding the light emitted from the lamp 220 to the entire surface of a substrate the LCD panel and a plurality of lower and upper diffusion sheets 260, 290 and lower and upper prism sheets 270, 280 formed on the light-guiding plate 240 in multiple layers.

At this time, edges of the diffusion sheets 260 and 290 and the prism sheets 270 and 280 extend to upper surfaces of the metal reflecting plate 230 and the mold frame 210.

That is, the diffusion sheets 260 and 290 and prism sheets 270 and 280 are overlapped with the metal reflecting plate 230 and the mold frame 210, so that it is possible to prevent gaps from being generating between the sheets 260, 270, 280 and 290 and the metal reflecting plate 230 or the mold frame 210.

Accordingly, it is possible to prevent the light emitted from the lamp 220 from leaking into a liquid crystal panel without passing through the lower diffusion sheet 260 among the sheets 260, 270, 280 and 290.

The backlight assembly according to the present invention has the accompanying advantages.

First, the gap is not generated between the edges of the sheets and the metal reflecting plate or the mold frame. Accordingly, it is possible to prevent light emitted from the lamp from leaking into the liquid crystal panel without passing through the sheets, thereby improving quality of the LCD device.

Also, the pad used for preventing light from leaking in the related art backlight assembly is not used in the backlight assembly according to the present invention, thereby decreasing the thickness of the LCD module.

Furthermore, the edges of the sheets are overlapped with the upper surface of the metal reflecting plate, so that the gap is decreased between the liquid crystal panel and the metal reflecting plate or the mold frame. Accordingly, it is possible to decrease wrinkles on the diffusion and prism sheets due to heat during operation of the LCD device, thereby decreasing deterioration of the picture image.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A backlight assembly of a liquid crystal display (LCD) device for emitting light for an entire surface of an liquid crystal panel, comprising:

a mold frame;

a lamp mounted at one side of the mold frame;

a metal reflecting plate mounted at a side of the mold frame and partially surrounding one part of the lamp;

a light-guiding plate mounted in parallel with the lamp;

a reflecting sheet positioned under the light-guiding plate;

a plurality of diffusion and prism sheets positioned on the light-guiding plate;

at least one edge of one of the diffusion and prism sheets overlapping an edge of the metal reflecting plate, wherein said edge of one of the diffusion and prism sheets overlapping an edge of the metal reflecting plate obscures a portion of a surface of the metal reflecting plate substantially parallel to the plane of said one of the diffusion and prism sheets.

2. A backlight assembly of a liquid crystal display (LCD) device for emitting light for an entire surface of an liquid crystal panel, comprising:

a mold frame;

a lamp mounted at one side of the mold frame;

a metal reflecting plate mounted at a side of the mold frame and partially surrounding one part of the lamp;

a light-guiding plate mounted in parallel with the lamp;

a reflecting sheet positioned under the light-guiding plate;

a plurality of diffusion and prism sheets positioned on the light-guiding plate;

at least one edge of one of the diffusion and prism sheets overlapping an edge of the mold frame, wherein said edge of one of the diffusion and prism sheets overlapping an edge of the mold frame obscures a portion of a surface of the frame substantially parallel to the plane of said one of the diffusion and prism sheets.

* * * * *